United States Patent
Kasai

(10) Patent No.: US 8,345,126 B2
(45) Date of Patent: Jan. 1, 2013

(54) SOLID-STATE IMAGE PICKUP ELEMENT AND CAMERA SYSTEM HAVING MECHANISM FOR CANCELING POTENTIAL DROP ON SIGNAL LINE

(75) Inventor: Gen Kasai, Kanagawa (JP)

(73) Assignee: Sony Corporation, Tokyo (JP)

( * ) Notice: Subject to any disclaimer, the term of this patent is extended or adjusted under 35 U.S.C. 154(b) by 361 days.

(21) Appl. No.: 12/670,515

(22) PCT Filed: May 26, 2009

(86) PCT No.: PCT/JP2009/059600
§ 371 (c)(1),
(2), (4) Date: Jan. 25, 2010

(87) PCT Pub. No.: WO2009/145186
PCT Pub. Date: Dec. 3, 2009

(65) Prior Publication Data
US 2010/0245643 A1     Sep. 30, 2010

(30) Foreign Application Priority Data

May 29, 2008   (JP) ................................. 2008-140627

(51) Int. Cl.
H04N 5/217 (2011.01)
H04N 5/341 (2011.01)
(52) U.S. Cl. ........................ 348/241; 348/308
(58) Field of Classification Search .................. 348/302, 348/241, 308; 250/208.1; 257/291, 292, 257/293, 294
See application file for complete search history.

(56) References Cited

U.S. PATENT DOCUMENTS

| 5,877,715 | A | 3/1999 | Gowda | |
|---|---|---|---|---|
| 6,344,877 | B1* | 2/2002 | Gowda et al. | 348/308 |
| 8,040,416 | B2* | 10/2011 | Fukuoka | 348/308 |
| 2002/0154233 | A1* | 10/2002 | Yoshimura et al. | 348/308 |
| 2005/0224841 | A1* | 10/2005 | Nakamura et al. | 257/215 |
| 2007/0024729 | A1* | 2/2007 | Muramatsu et al. | 348/308 |
| 2007/0096238 | A1* | 5/2007 | Oike et al. | 257/443 |
| 2008/0007638 | A1* | 1/2008 | Aoki et al. | 348/294 |
| 2008/0135729 | A1* | 6/2008 | Taura | 250/208.1 |
| 2009/0109315 | A1* | 4/2009 | Taura | 348/311 |
| 2009/0184238 | A1* | 7/2009 | Fukuoka et al. | 250/208.1 |

FOREIGN PATENT DOCUMENTS

| JP | 2001-069404 | 3/2001 |
|---|---|---|
| JP | 2008-017100 | 1/2008 |
| JP | 2008-118634 | 5/2008 |

OTHER PUBLICATIONS

International Search Report dated May 29, 2008.
European Search Report dated Feb. 22, 2012 for EP Application No. 09754694.9-2202 / 2280583 PCT/JP2009059600.

* cited by examiner

Primary Examiner — Jason Whipkey
(74) Attorney, Agent, or Firm — SNR Denton US LLP

(57) ABSTRACT

A pixel driving portion 102 can carry out first read drive with which a transfer element is turned OFF in accordance with a drive signal TG to output a signal at an output node, and second read drive with which the transfer element is turned ON in accordance with the drive signal TG to transfer signal charges to the output node, thereby outputting a signal at the output node. A pixel signal reading portion 103, 104 outputs a signal corresponding to a difference between the signal read out in accordance with the second read drive and the signal read out in accordance with the first read drive.

13 Claims, 10 Drawing Sheets

FIG. 7
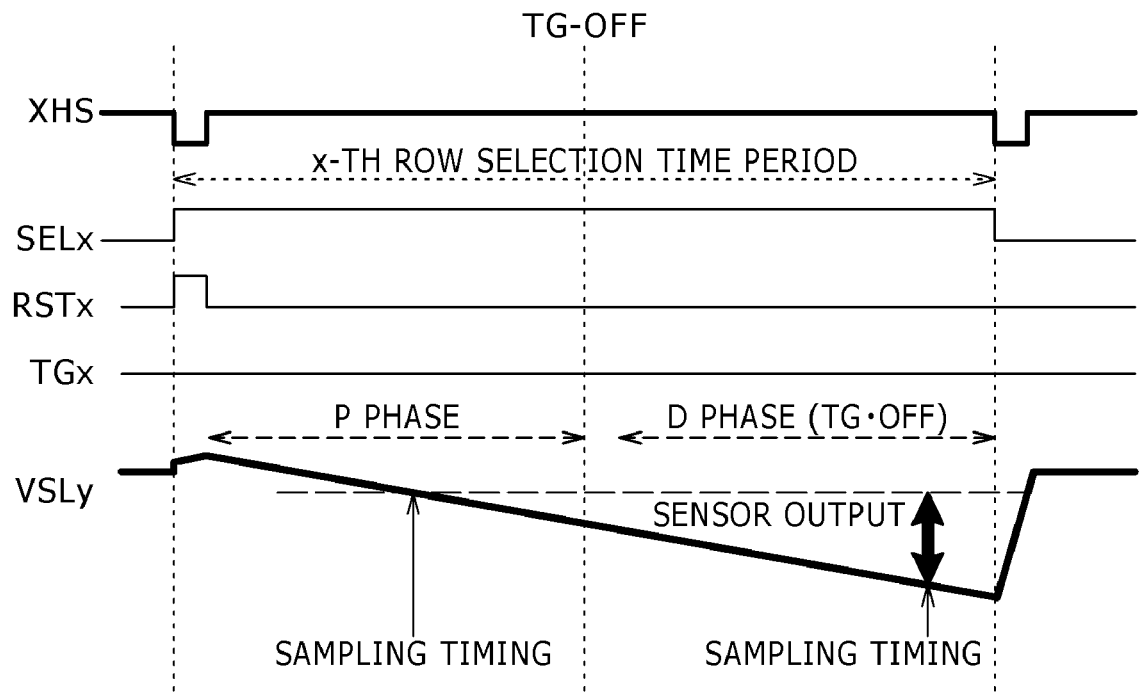
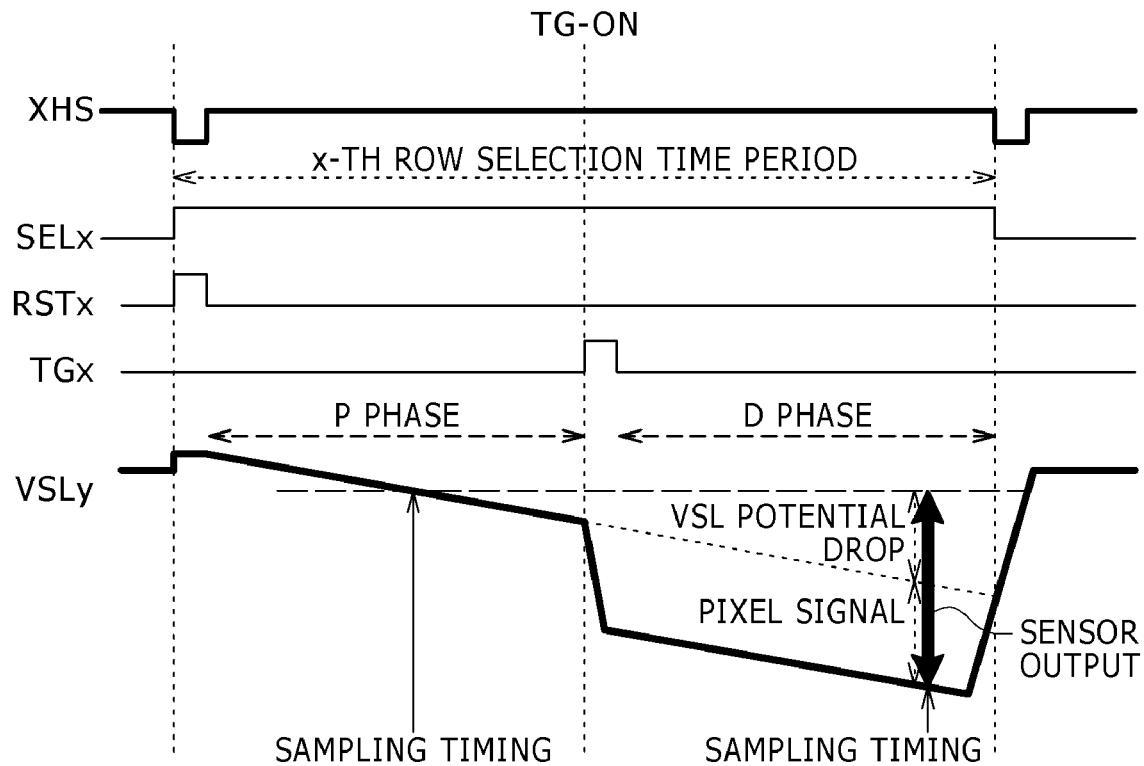

SOLID-STATE IMAGE PICKUP ELEMENT AND CAMERA SYSTEM HAVING MECHANISM FOR CANCELING POTENTIAL DROP ON SIGNAL LINE

TECHNICAL FIELD

The present invention relates to a solid-state image pickup element typified by a CMOS image sensor, and a camera system.

BACKGROUND ART

In recent years, a CMOS image sensor has attracted attention as a solid-state image pickup element (image sensor) as an alternative to a CCD.

The reason for this is because a dedicated process is required for manufacture of CCD pixels, and a plurality of power source voltages are required for an operation of the CCD, and moreover the CCD needs to be operated based on a combination of a plurality of peripheral ICs.

Also, the reason for this is that the CMOS image sensor overcomes various kinds of problems that in the case of such a CCD, the system becomes very complicated, and so forth.

The same manufacture process as that for a general CMOS type integrated circuit can be used for manufacture of the CMOS image sensor. In addition, the CMOS image sensor can be driven by a single power source. Moreover, an analog circuit and a logical circuit each manufactured by using a CMOS process can be provided in the same chip in a mixed manner.

For this reason, the CMOS image sensor has a plurality of large merits that the number of peripheral ICs can be reduced, and so forth.

A 1 channel (ch) output using a FD amplifier having the Floating Diffusion layer (FD: Floating Diffusion) is the mainstream in an output circuit of the CCD.

On the other hand, the CMOS image sensor has the FD amplifier every pixel. Such a column parallel output type CMOS image sensor that one row lying in a pixel array is selected, and data in the one row thus selected is simultaneously read out in a column direction is mainstream in an output of the CMOS image sensor.

The reason for this is because a sufficient drive ability is hardly obtained with the FD amplifier disposed within the pixel, and thus a data rate needs to be reduced, so that the parallel processing is advantageous.

Hereinafter, a general CMOS image sensor will be described.

In the CMOS image sensor, firstly, a reset voltage (Precharge phase: hereinafter referred to as a P phase) is read out, and thereafter, an addition voltage (Data phase: hereinafter referred to as a D phase) obtained by adding the reset voltage and a signal voltage to each other is read out, thereby outputting a signal obtained by subtracting the reset voltage from the addition voltage.

In the CMOS image sensor, such Correlated Double Sampling (CDS: Correlated Double Sampling) is generally carried out (for example, refer to a Patent Document 1).

FIG. 1 is a diagram showing an example of a pixel, of a CMOS image sensor, composed of four transistors.

This pixel 1 has a photoelectric conversion element 11, for example, composed of a photodiode. Also, the pixel 1 has the four transistors of a transfer transistor 12, a reset transistor 13, an amplification transistor 14, and a selection transistor 15 as active elements for the one photoelectric conversion element 11.

The photoelectric conversion element 11 photoelectrically converts an incident light into an amount of electric charges (electrons in this case) corresponding to a light quantity of the incident light.

The transfer transistor 12 is connected between the photoelectric conversion element 11 and a Floating Diffusion FD (Floating Diffusion). A drive signal TG is supplied to a gate (transfer gate) of the transfer transistor 12 through a transfer control line $LT_x$. As a result, the transfer transistor 12 transfers the electrons obtained through the photoelectric conversion in the photoelectric conversion element 11 to the floating diffusion FD.

The reset transistor 13 is connected between a power source line LVDD and the floating diffusion FD. A reset signal RST is supplied to a gate of the reset transistor 13 through a reset control line LRST. As a result, the reset transistor 13 resets a potential at the floating diffusion FD at a potential of the power source line LVDD.

A gate of the amplification transistor 14 is connected to the floating diffusion FD. The amplification transistor 14 is connected to a signal line 16 through the selection transistor 15, thereby composing a source follower together with a constant current source provided outside the pixel portion.

Also, an address signal (select signal) SEL is supplied to a gate of the selection transistor 15 through a selection control line LSEL, thereby turning ON the selection transistor 15.

When the selection transistor 15 is turned ON, the amplification transistor 14 amplifies the potential at the floating diffusion FD, thereby outputting a voltage corresponding to the potential thus amplified to the signal line 16. Voltages outputted from the respective pixels are outputted to a column circuit (column processing circuit) through the respective signal lines 16.

A reset operation of the pixel is such that the transfer transistor 12 is turned ON for the electric charges accumulated in the photoelectric conversion element 11, and thus the electric charges accumulated in the photoelectric conversion element 11 are transferred to the floating diffusion FD to be discharged.

At this time, the floating diffusion FD turns ON the reset transistor 13 to discharge the electric charges to the power source side in advance so that the floating diffusion FD receives the electric charges accumulated in the photoelectric conversion element 11. Or, while the transfer transistor 12 is held in an ON state, the floating diffusion FD turns ON the reset transistor 13 in parallel with turn-ON of the transfer transistor 12, thereby directly discharging the electric charges to the power source in some cases.

On the other hand, in a read operation, firstly, the reset transistor 13 is turned ON to reset the floating diffusion FD. In this state, an output signal is outputted to the output signal line 16 through the selection transistor 15 turned ON. This output is referred to as a P-phase output.

Next, the transfer transistor 12 is turned ON to transfer the electric charges accumulated in the photoelectric conversion element 11 to the floating diffusion FD. An output signal obtained through the transfer of the electric charges is outputted to the output signal line 16. This output is referred to as a D-phase output.

A difference between the D-phase output and the P-phase output is obtained in an outside of the pixel circuit, and a reset noise of the floating diffusion FD is canceled, thereby obtaining an image signal.

FIG. 2 is a diagram showing an example of a general configuration of the CMOS image sensor (solid-state image pickup element) in which the pixels each shown in FIG. 1 are disposed in a two-dimensional array.

The CMOS image sensor 20 shown in FIG. 2 is composed of a pixel array portion 21 in which the pixel circuits each shown in FIG. 1 are disposed in a two-dimensional array, a row selecting circuit (either a pixel driving circuit or a vertical driving circuit) 22, and a column circuit (column processing circuit) 23.

The pixel driving circuit 22 controls turn-ON/OFF of the transfer transistor 12, the reset transistor 13, and the selection transistor 15 in each of the pixels in each of the rows.

The column circuit 23 is a circuit for receiving data in the row of the pixels read-controlled by the pixel driving circuit 22, and transferring the data to a signal processing circuit in a subsequent stage.

FIG. 3 is a diagram showing a timing chart of a pixel data reading operation in the CMOS image sensor shown in FIG. 1 and FIG. 2.

In the pixel array portion in which the pixels each shown in FIG. 1 are disposed in m rows and n columns, a change in potential VSL of the vertical signal line 16 belonging to a y-th column for a time period (a time period of 1 H) for which as shown in FIG. 3, the pixels belonging to an x-th row are selected is designated by $VSL_y$ ($1 \leq x \leq m$, $1 \leq y \leq n$).

A select signal $SEL_x$ for the x-th row becomes a high level, thereby selecting an x-th row. Also, when the reset signal $RST_x$ becomes a high level, the floating diffusion FD of the pixel in the x-th row and the y-th column becomes a high level, so that the potential $VSL_y$ becomes a reset level referred to as the P phase.

After that, when a drive signal $TG_x$ becomes a high level, the electric charges within the pixel move to the floating diffusion FD, and thus the potential of the floating diffusion FD drops, so that the potential $VSL_y$ of the signal line 16 drops.

A level of the potential $VSL_y$ of the signal line 16 at that time is made to be the D phase.

A difference between the D phase and the P phase is outputted similarly to the case of the foregoing, whereby a sensor output, having less noise, in which manufacture dispersions of the VSLs are canceled is obtained.

PRIOR ART DOCUMENT

Patent Document

Patent Document 1: Japanese Patent Laid-Open No. 2001-69404

SUMMARY OF THE INVENTION

In the CMOS image sensor described above, however, the output of the sensor contains therein a component other than the pixel signal which is to be essentially outputted.

It is ideal that as shown in FIG. 3, either after the reset signal $RST_x$ becomes the high level, or after the drive signal $TG_x$ becomes the high level, the given potential is maintained.

Actually, however, as shown in FIG. 4, the potential VSL of the output signal line 16 drops due to the drop of the potential of the floating diffusion FD by a leakage current, or the like.

The output of the sensor at this time contains therein the pixel signal which is to be essentially outputted plus the potential drop of the VSL.

When the potential drop is large, a white point called an FD white point (TG·OFF white point), a vertical streak, a shading or the like occurs in the output image from the sensor. In particular, deterioration of an image quality at a low illuminance is caused.

In addition, in recent years, shared pixels in which the FD portion is shared among several pixels due to the seeking of miniaturization of the pixels have been used. In particular, in the case of the shared pixels, the deterioration of the image quality is remarkable because the FD white point becomes a defect spanning the number of pixels shared.

The present invention aims at providing a solid-state image pickup element with which a drop of a potential of a signal line for a read time period can be canceled, a noise can be reduced, and in turn a high image quality is realized, and a camera system.

A solid-state image pickup element according to a first aspect of the present invention has: a pixel portion in which a plurality of pixel circuits each having a mechanism for converting an optical signal into an electrical signal, and accumulating the electrical signal in accordance with exposure time are disposed in a matrix; a pixel driving portion which can be driven so as to carry out the accumulation, and transfer and output of signal electric charges in the pixel portion; and a pixel signal reading portion for reading signals of pixels from the pixel portion; the pixel circuit of the pixel portions includes; an output node; a photoelectric conversion element for converting the optical signal into the electrical signal, and accumulating therein the signal electric charges; and a transfer element which is turned ON/OFF in accordance with a drive signal, and transfers the electric charges in the photoelectric conversion element in an ON state to the output node; the pixel driving portion can carry out first read drive with which the transfer element is turned OFF in accordance with the drive signal to output the signal at the output node, and second read drive with which the transfer element is turned ON in accordance with the drive signal to transfer the signal electric charges to the output node, thereby outputting the signal at the output node; and the pixel signal reading portion has a function of outputting a signal corresponding to a difference between a signal read out in accordance with the second read drive, and a signal read out in accordance with the first read drive.

A solid-state image pickup element according to a second aspect of the present invention has: a pixel portion in which a plurality of pixel circuits each having a mechanism for converting an optical signal into an electrical signal, and accumulating the electrical signal in accordance with exposure time are disposed in a matrix; a pixel driving portion which can be driven so as to carry out reset of the pixel portion, and accumulation and output of signal electric charges; and a pixel signal reading portion for reading signals of pixels from the pixel portion; the pixel circuit of the pixel portions includes; an output node; a photoelectric conversion element for converting the optical signal into the electrical signal, and accumulating therein the signal electric charges; a reset element which is turned ON/OFF in accordance with a reset signal, and resets the output node in an ON state; and a transfer element which is turned ON/OFF in accordance with a drive signal, and transfers the electric charges in the photoelectric conversion element in the ON state to the output node; the pixel driving portion can carry out first read drive with which reset read drive with which the reset element is turned ON in accordance with the reset signal to output a signal at the output node, and non-transfer read drive with which the transfer element is turned OFF in accordance with the drive signal to output the signal at the output node are carried out, and second read drive with which reset read drive with which the reset element is turned ON in accordance with the reset signal to output the signal at the output node, and transfer read drive with which the transfer element is turned ON in accordance with the drive signal to transfer the signal electric charges to the output node, thereby outputting the signal at the output node are carried out; and the pixel signal reading portion has a function of outputting a signal corresponding to a difference between a signal read out in accordance with the second read drive, and a signal read out in accordance with the first read drive.

Suitably, the pixel driving portion and the pixel signal reading portion carry out the first read drive and the second read drive, and the output of the signal corresponding to the difference between the signal read out in accordance with the second read drive and the signal read out in accordance with the first read drive for a time period for which data for one row of the pixels is read out.

Suitably, the pixel signal reading portion includes: a plurality of comparators which are disposed so as to correspond to a column arrangement of the pixels, and which compare read-out signal potentials with a reference voltage for judgment, and output judgment results, respectively; and a plurality of up/down counters operations of which are controlled in accordance with outputs from the comparators, respectively, and each of which counts comparison time of corresponding one of the comparators.

Suitably, the plurality of up/down counters carry out either down count or up count in a phase of the first read drive, and carry out either up count or down count in a phase of the second read drive.

Suitably, the plurality of up/down counters carry out either up count or down count in the reset read drive, and carry out either down count or up count in the non-transfer read drive in the phase of the first read drive, and carry out either down count or up count in the reset read drive and carry out either up count or down count in the transfer read drive in the phase of the second read drive.

Suitably, the plurality of up/down counters carry out either down count or up count in the non-transfer read drive in the phase of the first read drive, and carry out either up count or down count in the transfer read drive in the phase of the second read drive.

Suitably, a first mode and a second mode can be switched over to each other in accordance with a mode switching signal; in a phase of the first mode, the pixel driving portion carries out only the second read drive, and the pixel signal reading portion outputs a signal read out in accordance with the second read drive; and in a phase of the second mode, the pixel driving portion carries out the first read drive and the second read drive, and the pixel signal reading portion outputs a signal corresponding to a difference between the signal read out in accordance with the second read drive and a signal read out in accordance with the first read drive.

A camera system according to a third aspect of the present invention has: a solid-state image pickup element; an optical system for imaging an image of a subject on the solid-state image pickup element; and a signal processing circuit for processing an output image signal from the solid-state image pickup element; the solid-state image pickup element has: a pixel portion in which a plurality of pixel circuits each having a mechanism for converting an optical signal into an electrical signal, and accumulating the electrical signal in accordance with exposure time are disposed in a matrix; a pixel driving portion which can be driven so as to carry out the accumulation, and transfer and output of signal electric charges in the pixel portion; and a pixel signal reading portion for reading signals of pixels from the pixel portion; the pixel circuit of the pixel portions includes; an output node; a photoelectric conversion element for converting the optical signal into the electrical signal, and accumulating therein the signal electric charges; and a transfer element which is turned ON/OFF in accordance with a drive signal, and transfers the electric charges in the photoelectric conversion element in an ON state to the output node; the pixel driving portion can carry out first read drive with which the transfer element is turned OFF in accordance with the drive signal to output the signal at the output node, and second read drive with which the transfer element is turned ON in accordance with the drive signal to transfer the signal electric charges to the output node, thereby outputting the signal at the output node; and the pixel signal reading portion has a function of outputting a signal corresponding to a difference between a signal read out in accordance with the second read drive, and a signal read out in accordance with the first read drive.

A camera system according to a fourth aspect of the present invention has: a solid-state image pickup element; an optical system for imaging an image of a subject on the solid-state image pickup element; and a signal processing circuit for processing an output image signal from the solid-state image pickup element; the solid-state image pickup element has: a pixel portion in which a plurality of pixel circuits each having a mechanism for converting an optical signal into an electrical signal, and accumulating the electrical signal in accordance with exposure time are disposed in a matrix; a pixel driving portion which can be driven so as to carry out reset of the pixel portion, and accumulation and output of signal electric charges; and a pixel signal reading portion for reading signals of pixels from the pixel portion; the pixel circuit of the pixel portions includes; an output node; a photoelectric conversion element for converting the optical signal into the electrical signal, and accumulating therein the signal electric charges; a reset element which is turned ON/OFF in accordance with a reset signal, and resets the output node in an ON state; and a transfer element which is turned ON/OFF in accordance with a drive signal, and transfers the electric charges in the photoelectric conversion element in the ON state to the output node; the pixel driving portion can carry out first read drive with which reset read drive with which the reset element is turned ON in accordance with the reset signal to output a signal at the output node, and non-transfer read drive with which the transfer element is turned OFF in accordance with the drive signal to output the signal at the output node are carried out, and second read drive with which reset read drive with which the reset element is turned ON in accordance with the reset signal to output the signal at the output node, and transfer read drive with which the transfer element is turned ON in accordance with the drive signal to transfer the signal electric charges to the output node, thereby outputting the signal at the output node are carried out; and the pixel signal reading portion has a function of outputting a signal corresponding to a difference between a signal read out in accordance with the second read drive, and a signal read out in accordance with the first read drive.

According to the present invention, the first read drive with which the transfer element is turned OFF in accordance with the drive signal to output the signal at the output node, and the second read drive with which the transfer element is turned ON in accordance with the drive signal to transfer the signal electric charges to the output node, thereby outputting the signal at the output node are carried out in the pixel driving portion.

The read signal based on the first read drive and the read signal based on the second read drive are supplied to the pixel signal reading portion.

Also, in the pixel signal reading portion, the difference between the signal read out in accordance with the second read drive and the signal read out in accordance with the first read drive is obtained, and the signal corresponding to that difference is outputted.

According to the present invention, the drop of the potential of the signal line for the read time period can be canceled, the noise can be reduced, and in turn the high image quality increasing can be realized.

BRIEF DESCRIPTION OF DRAWINGS

FIG. 7 is a timing chart for explaining P-phase read and D-phase read according to the embodiment.

BEST MODE FOR CARRYING OUT THE INVENTION

Hereinafter, an embodiment of the present invention will be described in conjunction with the drawings.
<First Embodiment>

Figure 1:
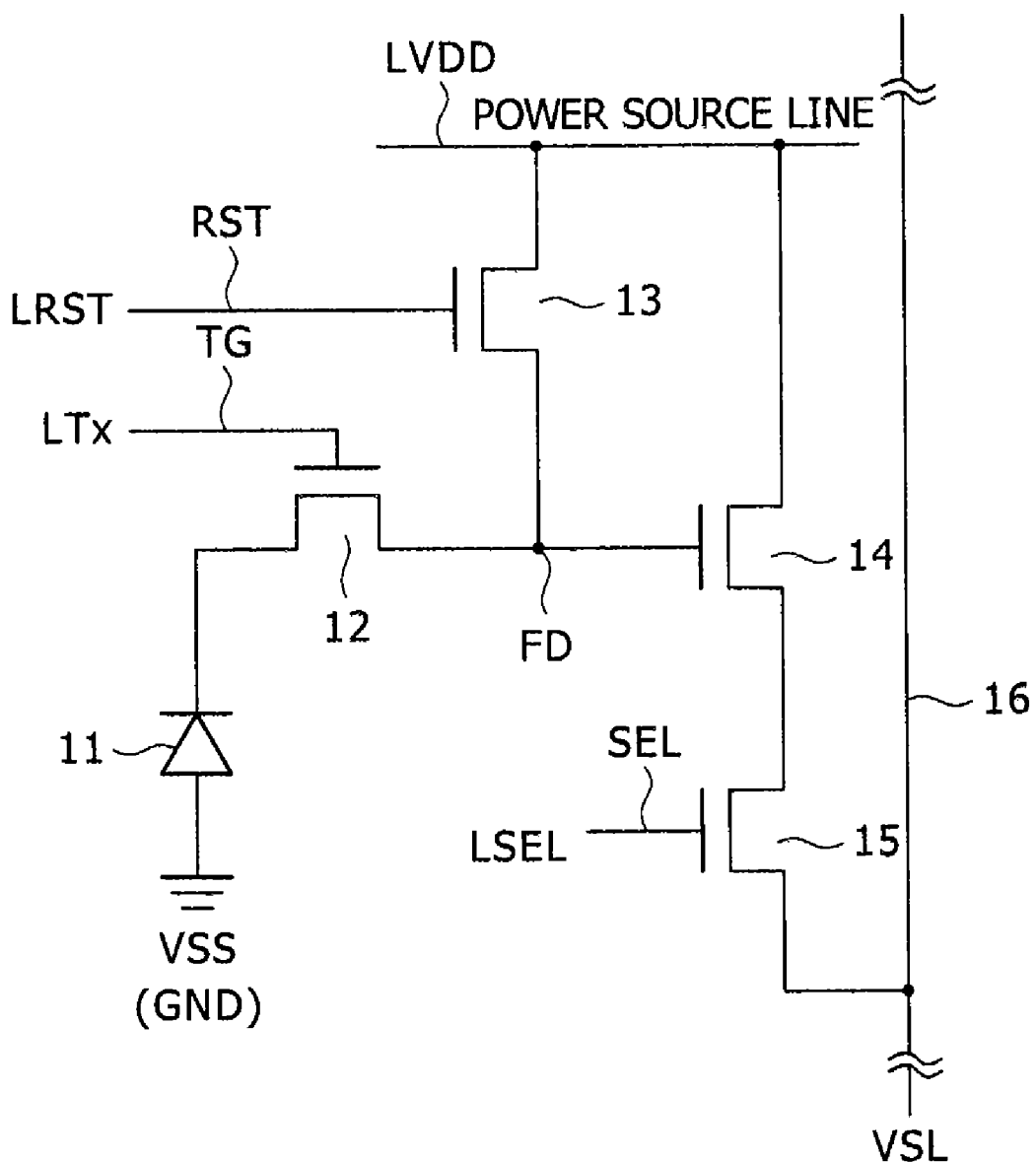
FIG. 1 is a diagram showing an example of a pixel in a CMOS image sensor composed of four transistors.
Figure 2:
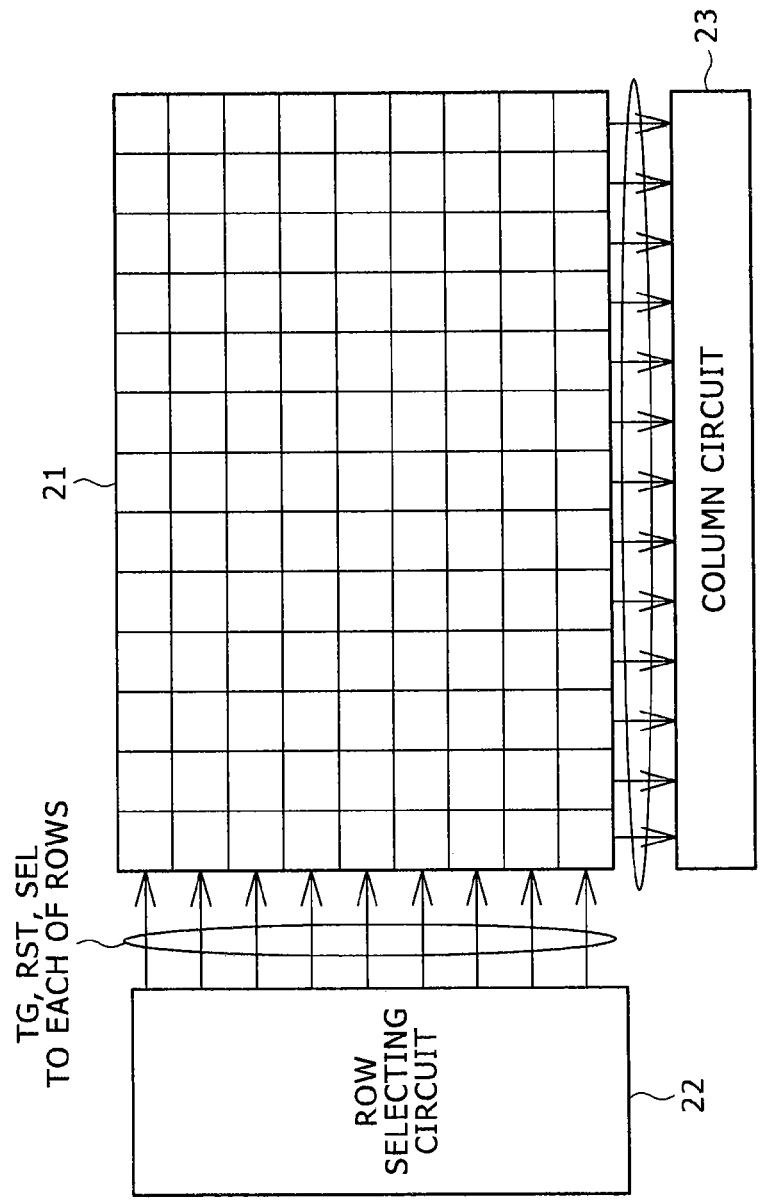
FIG. 2 is a diagram showing an example of a general configuration of the CMOS image sensor (solid-state image pickup element) in which the pixels each shown in FIG. 1 are disposed in a two-dimensional array.
Figure 3:
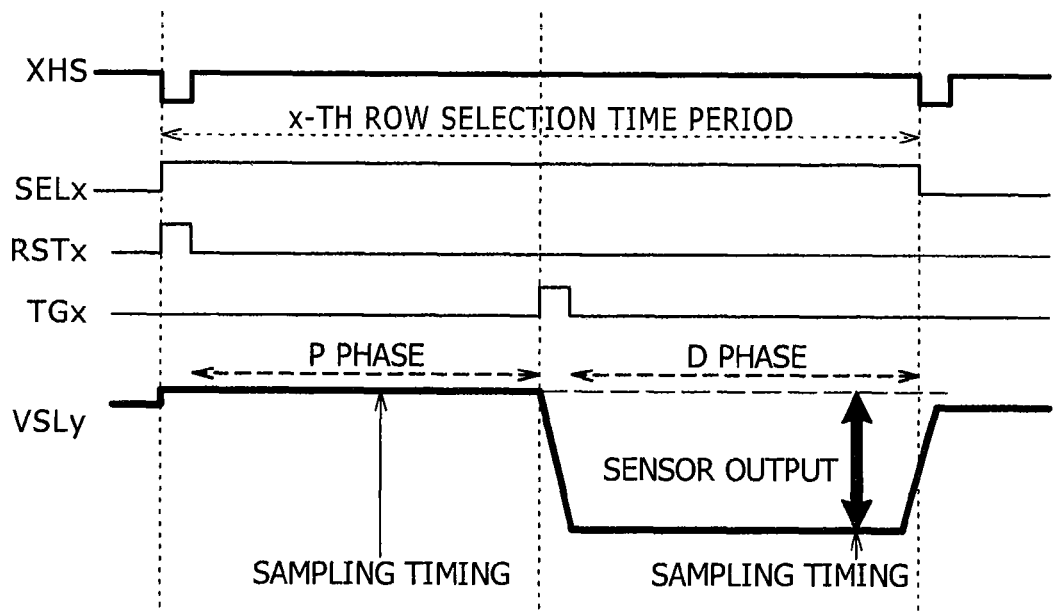
FIG. 3 is a timing chart for explaining P-phase read and D-phase read in the general CMOS image sensor.
Figure 4:
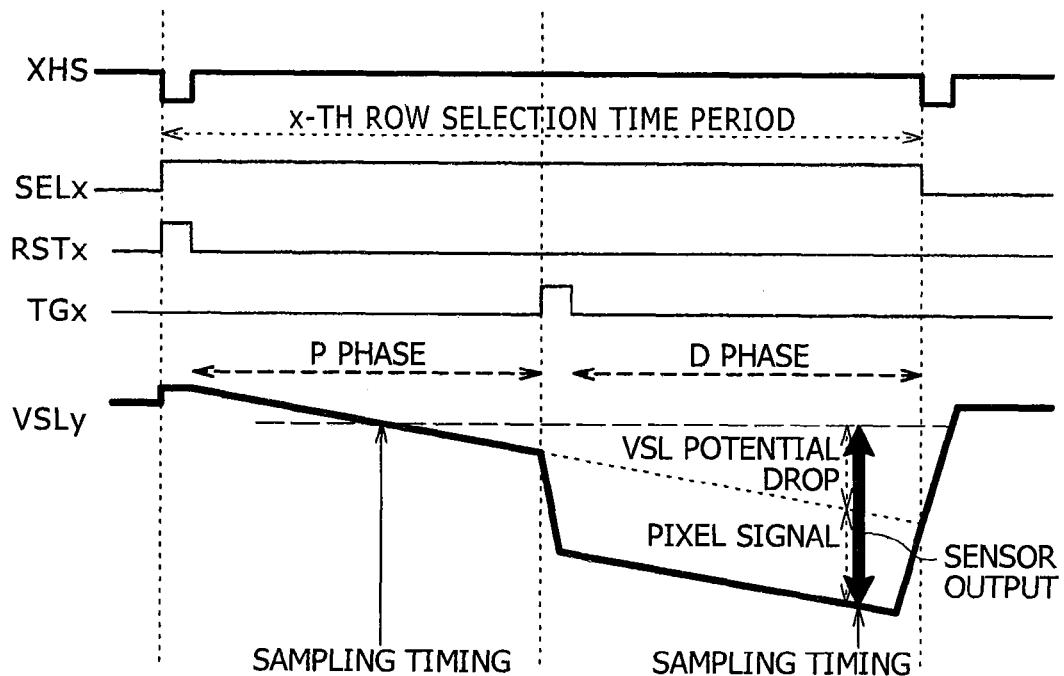
FIG. 4 is a diagram for explaining a problem of the P-phase read and the D-phase read in the general CMOS image sensor.
Figure 5:
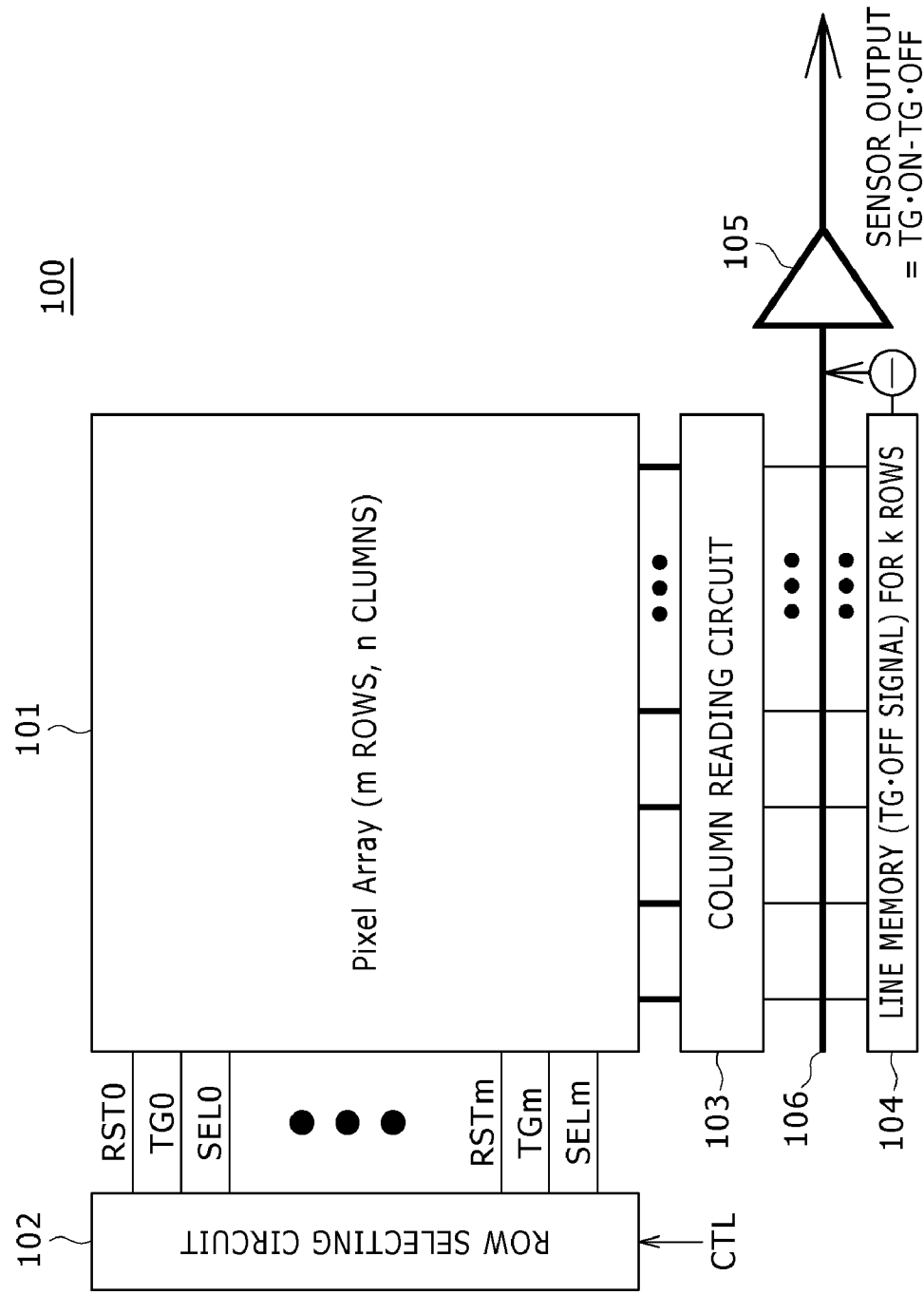
FIG. 5 is a diagram showing an example of a configuration of a CMOS image sensor (solid-state image pickup element) according to an embodiment of the present invention.

FIG. 5 is a diagram showing an example of a configuration of a CMOS image sensor (solid-state image pickup element) according to an embodiment of the present invention.

This CMOS image sensor 100 has a pixel array portion 101, a row selecting circuit (vertical driving circuit) 102 as a pixel driving portion, a column reading circuit (column processing circuit) 103, a line memory 104 for k rows, an amplifier circuit 105, and a transfer line 106.

A pixel signal reading portion is composed of the column reading circuit 103, the line memory 104, the amplifier circuit 105, and the transfer line 106 of these constituent elements.

In the pixel array portion 101, a plurality of pixel circuits are disposed in a two-dimensional shape (in a matrix) with m rows and n columns.

Figure 6:
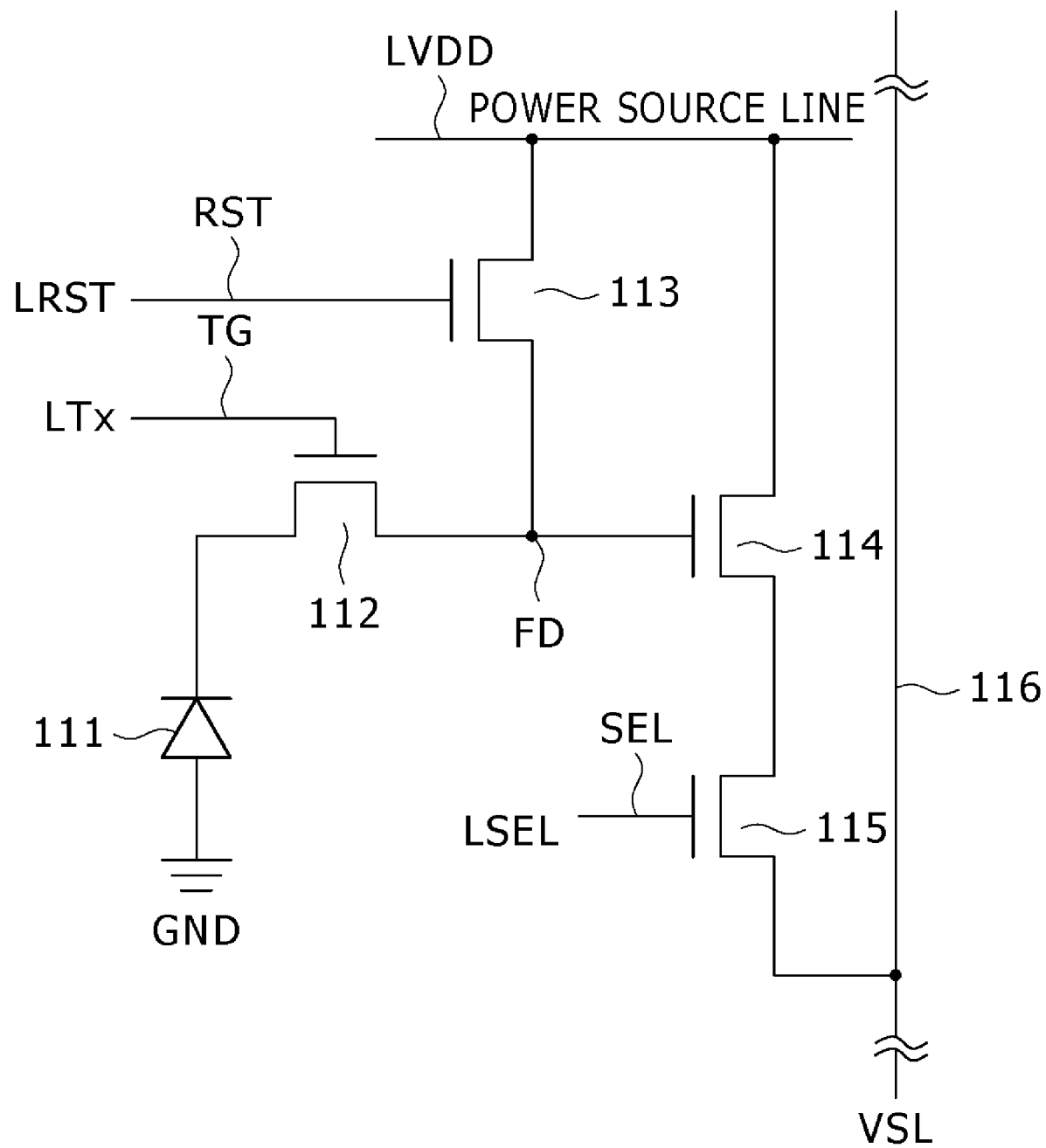
FIG. 6 is a diagram showing an example of a pixel of the CMOS image sensor composed of four transistors according to the embodiment.

FIG. 6 is a diagram showing an example of a pixel of the CMOS image sensor composed of four transistors according to the embodiment.

The pixel circuit 101A has a photoelectric conversion element 111, for example, composed of a photodiode.

The pixel circuit 101A has four transistors of a transfer transistor 112 as a transfer element, a reset transistor 113 as a reset element, an amplification transistor 114, and a selection transistor 115 as active elements for the one photoelectric conversion element 111.

The photoelectric conversion element 111 photoelectrically converts an incident light into electric charges (electrons in the embodiment) corresponding to a light quantity of the incident light.

The transfer transistor 112 is connected between the photoelectric conversion element 111 and a floating diffusion FD as an output node.

A drive signal TG is supplied to a gate (transfer gate) of the transfer transistor 112 through a transfer control line $LT_x$, thereby transferring the electrons generated through the photoelectric conversion made in the photoelectric conversion element 111 to the floating diffusion FD.

The reset transistor 113 is connected between the power source line LVDD and the floating diffusion FD.

A reset RST is supplied to a gate of the reset transistor 113 through a reset control line LRST, whereby the reset transistor 113 resets a potential of the floating diffusion FD at a potential of the power source line LVDD.

A gate of the amplification transistor 114 is connected to the floating diffusion FD. The amplification transistor 114 is connected to a signal line LSGN through the selection transistor 115, thereby composing a source follower together with a constant current source provided outside the pixel portion.

Also, a control signal (either an address signal or a select signal) SEL is supplied to a gate of the selection transistor 115 through a selection control line LSEL, thereby turning ON the selection transistor 115.

When the selection transistor 115 is turned ON, the amplification transistor 114 amplifies the potential at the floating diffusion FD to output a voltage corresponding to that potential to the signal line 116. Voltages outputted from the respective pixels are outputted to the column circuit 103 through the respective signal lines 116.

These operations are simultaneously carried out with respect to the pixels for one row because, for example, the gates of the transfer transistor 112, the reset transistor 113, and the selection transistor 115 are connected in rows.

The reset control line LRST, the transfer control line $LT_x$, and the selection control line LSEL which are wired in the pixel array portion 101 are wired as a set in rows of the pixel arrangement.

The reset control line LRST, the transfer control line $LT_x$, and the selection control line LSEL are driven by a row selecting circuit 102 as a pixel driving portion.

The row selecting circuit 102, for example, has a plurality of shift registers for outputting a reset signal RST and a drive signal TG to a control line to which each of the reset control line LRST, the transfer control line $LT_x$, and the selection control line LSEL is connected.

When so-called P-phase read and D-phase read are carried out, the row selecting circuit 102 is controlled in such a way that the P-phase read and the D-phase read are carried out multiple times (twice in this embodiment) under the control corresponding to a control signal CTL made by a control system (not shown).

The row selecting circuit 102 carries out output control for a drive signal TG in such a way that in a phase of drive for the first P-phase read and D-phase read, D-phase sampling is carried out while the drive signal TG for the transfer transistor 112 is held at a low level. The first P-phase read corresponds to a reset reading operation, and the first D-phase read corresponds to a non-transfer reading operation.

The row selecting circuit 102 carries out output control for the drive signal TG in such a way that in a phase of drive for the second P-phase read and D-phase read, the D-phase sampling is carried out while the drive signal TG for the transfer transistor 112 is held at a high level. The second P-phase read corresponds to the reset reading operation, and the second D-phase read corresponds to a transfer reading operation.

Processing for carrying out the D-phase sampling while the transfer transistor 112 is held turned OFF by setting the drive signal TG at the low level is referred to as TG•OFF signal processing.

Processing for carrying out the D-phase sampling while the transfer transistor 112 is held turned ON by setting the drive signal TG at the high level is referred to as TG•ON signal processing.

The column reading circuit 103 receives data, in the pixel row, which is read and controlled by the pixel driving circuit 102, and transfers the data in the pixel row to a signal processing circuit in a subsequent stage through the transfer line 106 and the amplifier circuit 105.

The line memory 104 stores therein a TG•OFF signal in the TG•OFF signal processing.

The CMOS image sensor 100 of this embodiment has a function of making the data of [TG•ON signal−TG•OFF signal] the sensor output, thereby canceling the drop of the potential VSL of the signal line 116 for a time period from the P-phase to the D-phase.

The CMOS image sensor 100 of this embodiment, for a time period for which data for one row of the pixels is read out, carries out the first read drive and the second read drive, and output of a signal corresponding to a difference between a signal read out in accordance with the second read drive and a signal read out in accordance with the first read drive.

Hereinafter, a description will be given with respect to processing for making the data of [TG•ON signal−TG•OFF signal] the sensor output by the CMOS image sensor 100 of this embodiment in conjunction with FIGS. 7(A) and (B).

FIGS. 7(A) and (B) are timing charts for explaining the P-phase read and the D-phase read according to this embodiment.

FIG. 7(A) shows the timing chart of the TG•OFF signal processing, and FIG. 7(B) shows the timing chart of the TG•ON signal processing.

In the pixel array portion 101 in which the pixels each shown in FIG. 6 are disposed in the matrix with m rows and n columns, a change in potential VSL of the vertical signal line 116 belonging to a y-th column for a time period (a time period of 1 H) for which the pixels belonging to an x-th row are selected as shown in FIGS. 7(A) and (B) is designated by $VSL_y$ ($1 \leq x \leq m$, $1 \leq y \leq n$).

In the TG•OFF signal processing, the select signal $SEL_x$ for the x-th row becomes the high level, thereby selecting the x-th row. When the reset signal $RST_x$ becomes the high level, the floating diffusion FD of the pixel in the x-th row and the y-th column becomes the high level, so that $VSL_y$ becomes the reset level called the P-phase.

In the TG•OFF signal processing, thereafter, the drive signal $TG_x$ is held at the low level, and the transfer transistor 112 is held turned OFF.

The sensor output at this time is the TG•OFF signal, which means that the drop of the potential VSL of the signal line 116 for the time period from the P-phase to the D-phase is outputted.

The TG•OFF signal is stored in the line memory 104 through the column reading circuit 103.

In the TG•OFF signal processing, the select signal SEL for the x-th row becomes the high level, thereby selecting the x-th row. When the reset signal $RST_x$ becomes the high level, the floating diffusion FD of the pixel in the x-th row and the y-th column becomes the high level, so that $VSL_y$ becomes the reset level called the P phase.

In the TG•ON signal processing, thereafter, when the drive signal $TG_x$ is held at the high level, and the transfer transistor 112 is held turned ON, the electric charges within the pixel move to the floating diffusion FD. Also, the potential at the floating diffusion FD drops, whereby the potential $VSL_y$ of the signal line 16 drops.

The level of the potential $VSL_y$ of the signal line 116 at that time is assigned to the D phase.

Also, the TG•OFF signal stored in the line memory 104 is subtracted from the TG•ON signal (TG•ON signal−TG•OFF signal), whereby a signal in which the drop of the potential VSL of the signal line 116 for the time period from the P-phase to the D-phase is canceled is outputted from the amplifier circuit 105.

As has been described so far, in the general CMOS image sensor, normally, in the D-phase read, the drive signal TG is set at the high level, thereby reading out the pixel data.

On the other hand, in this embodiment, in the first P-phase read and D-phase read, the D-phase sampling is carried out while the drive signal TG is held at the low level.

In this embodiment, the output of the sensor at this time is referred to as the TG•OFF signal, which means that the drop of the potential VSL of the signal line 116 for the time period from the P-phase to the D-phase is outputted.

Next, in the second P-phase read and D-phase read, the drive signal TG is set at the high level, and the D-phase sampling is carried out.

Also, in this embodiment, the TG•OFF signal, as shown in FIG. 7(A), is read out, for example, every k rows ($1 \leq k \leq m$) to be stored in the line memory 104 for the k rows.

After that, the TG•ON signal as shown in FIG. 7(B) is read out, and the difference between the TG•ON signal and the TG•OFF signal belonging to the same row is outputted.

In general, a value of k becomes either one row or m rows in many cases.

When k=1, the TG•OFF signal of the x-th row→the TG•ON signal of the x-th row→the TG•OFF signal of the (x+1)-th row→the TG•ON signal of the (x+1)-th row→ . . . is repeated.

When k=m, after the TG•OFF signals for one frame are read out and are then stored in the frame memory, the TG•ON signals are read out.

It is noted that since it is expected that the TG•OFF signal has the less electric change unless there is no change in temperature, it is also possible that after the TG•OFF signals for one frame are stored in the frame memory, differences between the TG•ON signals for several frames and the TG•OFF signals for the same frames as those of the TG•ON signals are obtained, thereby increasing a frame rate.

As has been described so far, according to this embodiment, the following effects can be obtained.

In the general CMOS image sensor, [sensor output (TG•ON signal)=pixel signal+VSL potential drop] is obtained.

On the other hand, in the CMOS image sensor 100 of this embodiment, [sensor output=TG•ON signal−TG•OFF signal=pixel signal+VSL potential drop−VSL potential drop=pixel signal] is obtained. Thus, it is possible to obtain the sensor output, having the less noise, in which the drop of the potential of the signal line VSL which has not been able to be canceled in the existing CMOS image sensor is canceled.

It is noted that since in this embodiment, both the TG•ON signal and the TG•OFF signal are necessary for each of the rows, it is feared that the frame rate is hardly increased as compared with the general CMOS image sensor in which only the TG•ON output is carried out.

However, the drop of the VSL potential for the time period from the P phase to the D phase (the FD white point or the like) exerts a large influence on the phase of the low illuminance at which the output of the pixel data is small in terms of the picture.

In general, in the phase of the low illuminance, an amount of signal is ensured by the exposure for a long time in which the frame rate is reduced in many cases.

Figure 8:
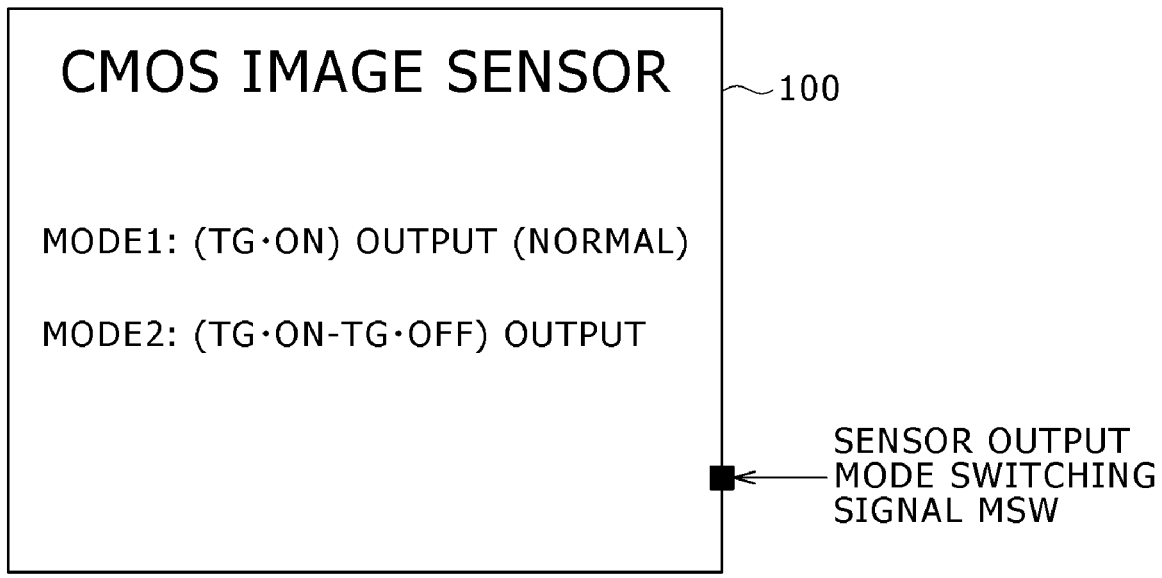
FIG. 8 is a diagram for explaining a solid-state image pickup element (CMOS image sensor) in which a plurality of modes can be switched over to one another.

For this reason, as shown in FIG. 8, the sensor is made to have a first mode MODE1 as a normal mode in which the TG•ON signal is outputted, and a second mode MODE2 in which [TG•ON signal−TG•OFF signal] in the embodiment described above is outputted mainly in the phase of image capturing with low illuminance.

Also, if one mode is switched over to the other mode corresponding to the subject in accordance with a mode switching signal MSW, the optimal drive can be carried out every subject.

It should be noted that although the CMOS image sensor according to the embodiments is especially by no means limited, for example, the CMOS image sensor concerned can also be configured in the form of a CMOS image sensor equipped with a column parallel type analog digital converter (hereinafter referred to as ADC (Analog digital converter) for short).

Figure 9:
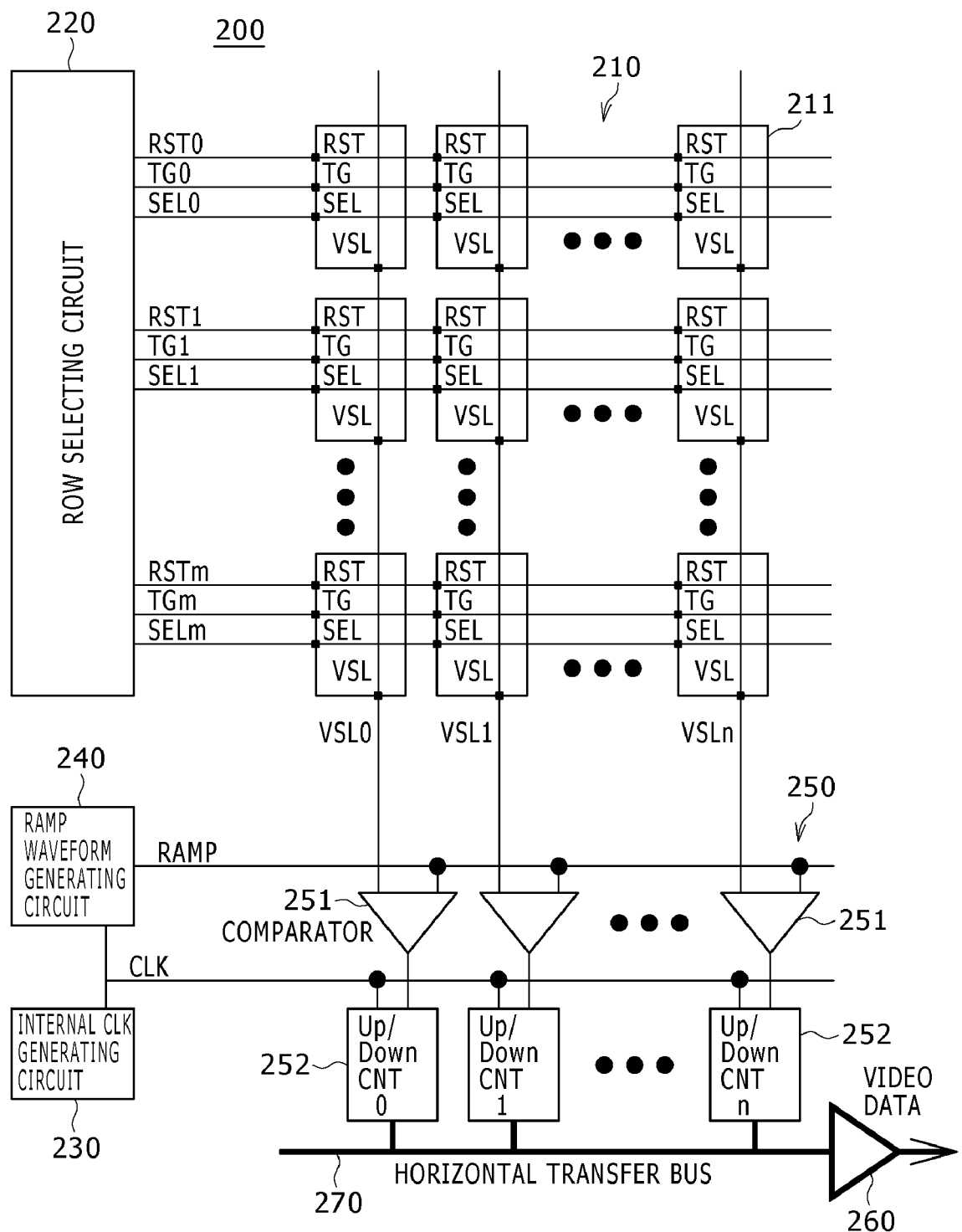
FIG. 9 is a block diagram showing an example of a configuration of a solid-state image pickup element (CMOS image sensor) equipped with a column parallel ADC according to the embodiment of the present invention.

FIG. 9 is a block diagram showing an example of a configuration of a solid-state image pickup element (CMOS image sensor) equipped with a column parallel ADC according to the embodiment of the present invention.

This solid-state image pickup element 200, as shown in FIG. 9, has a pixel portion 210 as an image pickup portion, a row selecting circuit 220 as a pixel driving portion, an internal clock (CLK) generating circuit 230, a ramp (RAMP) waveform generating circuit 240, an ADC group 250 in which a plurality of ADCs (analog-digital (AD) converters) as a pixel signal reading portion are disposed in parallel with one another, an amplifier circuit (S/A) 260, and a transfer line 270.

The pixel portion 210 is configured in such a way that pixels 211 each including a photodiode and an intra-pixel amplifier, and having a configuration, for example, as shown in FIG. 6 are disposed in a matrix (in rows and columns) with m rows and n columns.

Basically, a plurality of ADCs each composed of a comparator 251 for comparing a ramp waveform (RAMP) in which a reference voltage generated by the ramp waveform generating circuit 240 is changed in a staircase pattern, and an analog signal potential VSL obtained from the pixels every row line through corresponding one of vertical signal lines with each other, and an up/down counter 252 having a counter for counting comparison time, and a latch, for example, including an N-bit memory for holding therein the count result are disposed in a plurality of columns, respectively, in the ADC group 250.

The ADC group 250 has a function of carrying out the conversion into an n-bit digital signal, and the ADC of the ADC group 250 is disposed every vertical signal line (column line), thereby configuring a column parallel ADC block.

The outputs of the latches are connected to the transfer line 270, for example, having a 2n-bit width.

Also, the amplifier circuit 260 corresponding to the transfer line 270 is disposed.

Basically, in the ADC group 250, an analog pixel signal $V_{sig}$ (potential VSL) read out to the corresponding one of the vertical signal lines is compared with the ramp waveform RAMP as a slope waveform as the reference voltage in the comparator 251 disposed every column.

At this time, the up/down counter 252 disposed every column similarly to the case of the comparator 251 operates. Thus, a certain potential $V_{slope}$ of the ramp waveform RAMP, and the counter value change while one-to-one correspondence is obtained between them, thereby converting the potential (analog signal) VSL of the corresponding one of the vertical signal lines into the digital signal.

A change in reference voltage $V_{slope}$ is obtained by converting a change in voltage into a change in time. Thus, the time is counted for a certain period (clock), thereby converting the analog signal into the digital value.

Also, when the analog electrical signal VSL and the reference voltage $V_{slope}$ cross in level each other, the output from the comparator 251 is inversed to either stop an input clock to the up/down counter 252, or input the clock stopped in its input to the up/down counter 252, thereby completing the AD conversion.

After completion of the time period from the AD conversion described above, the data held in the latches is transferred to the transfer line 270 to be inputted to the signal processing circuit (not shown) through the amplifier circuits 260, thereby creating a two-dimensional image through predetermined signal processing.

In the manner described above, the circuit configuration realizing the output of [TG•ON signal−TG•OFF signal] is applied to the column ADC circuit using the up/down counter in each of the columns, thereby making it possible to realize the output of [TG•ON signal−TG•OFF signal] requiring no line memory.

This configuration is one of the circuits most effective to the output of [TG•ON signal−TG•OFF signal].

As has been stated, the signal potential VSL of each of the columns is compared with the ramp waveform RAMP, and the number of clocks CLK until the output from the corresponding one of the comparators 251 is inverted is counted, thereby making it possible to obtain the sensor output through the AD conversion in each of the columns.

In addition, the down count is carried out in the phase of the P phase, and the up count is carried out in the phase of the D phase, thereby making it possible to carry out the CDS for the D phase−P phase in each of the columns.

Figure 10:
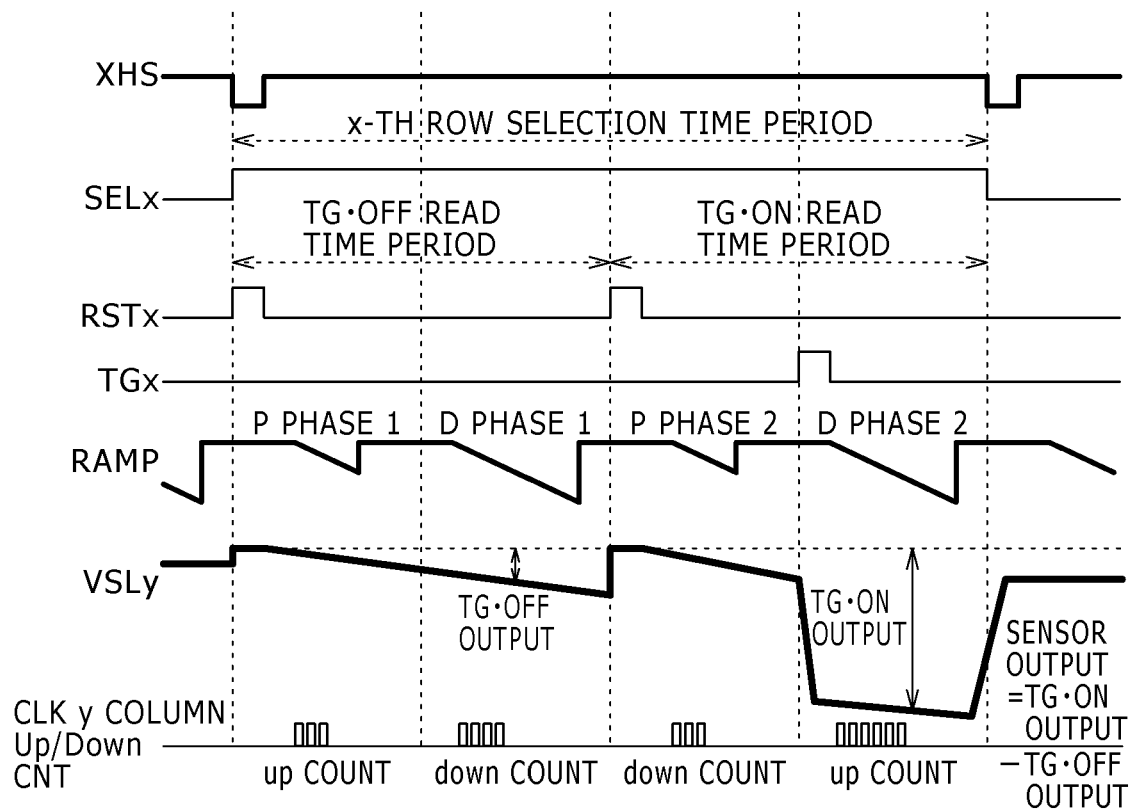
FIG. 10 is a timing chart showing a reading method, for a time period of 1 H, of realizing output of [TG•ON signal−TG•OFF signal] in the CMOS image sensor shown in FIG. 9.

FIG. 10 is a timing chart showing a reading method for the time period of 1 H for which the output of [TG•ON signal−TG•OFF signal] is realized in the CMOS image sensor shown in FIG. 9.

In this case, two time periods of a TG•ON read time period and a TG•OFF read time are contained in the time period of 1 H. Although there is no difference in order of the two time periods, FIG. 10 shows an example in which the TG•OFF read time period is firstly made.

For the TG•OFF read time period, after a reset signal $RST_x$ is set at a high level, a value of a P phase 1 is up-counted by the up/down counter 252.

After that, a value of a D phase 1 is down-counted by the up/down counter 252 while the drive signal TG is held at a low level.

For the TG•ON read time period, after the reset signal $RST_x$ is set at the high level, a value of a P phase 2 is down-counted by the up/down counter 252.

After that, the drive signal TG is set at the high level, and a value of a D phase 2 is up-counted by the up/down counter 252.

A difference in behavior between the TG•OFF read time period and the TG•ON read time period is that the drive signal TG in the phase of the D phase is held at the low level (TG=Low) for the TG•OFF read time period, and is held at the high level (TG=High) for the TG•ON read time period.

Finally, in accordance with the reading method shown in FIG. 10, the sensor output becomes [sensor output =TG•ON signal−TG•OFF signal=D phase 2−P phase 2−(D phase 1−P phase 1)=D phase 1−P phase 1−P phase 2+D phase 2].

In such a manner, by the column ADC using the up/down counter, the output of [TG•ON signal−TG•OFF signal] can be realized without requiring a special line memory.

Figure 11:
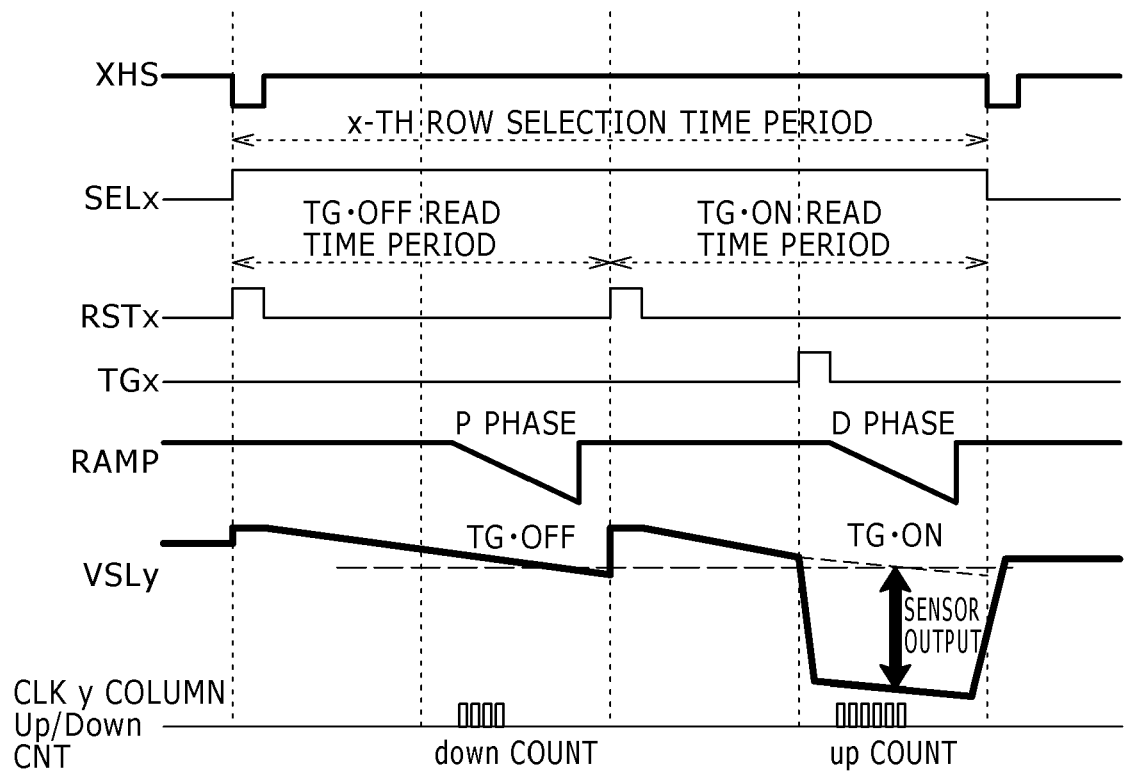
FIG. 11 is a timing chart showing another reading method, for a time period of 1 H, of realizing output of [TG•ON signal−TG•OFF signal] in the CMOS image sensor of FIG. 9.

It is noted that since the P phase 1 and the P phase 2 ought to basically become the same potential, as shown in FIG. 11, the TG•OFF output is down-counted (P phase) and the TG•ON output is up-counted (D phase), thereby making it possible to simplify the ramp waveform RAMP and the operation of the counter.

As a result, the further reduced low power consumption and the speed-up become possible.

As has been described so far, according to this embodiment, the following effects can be obtained.

The image having the less noise is obtained in which the TG•OFF white point, the vertical streak, the shading and the like due to the drop of the potential of the signal potential VSL for the time period from the P phase to the D phase are canceled (TG•OFF canceled output).

By the application to the column ADC circuit using the up/down counter, the image of the TG•OFF canceled output having the less noise is obtained without the line memory.

Normally, the image capturing is carried out at the high frame rate, and at the time of the low illuminance in which the TG•OFF white point or the like is highly visible, the current mode is switched over to the TG•OFF canceled output mode, whereby the optimal image can be obtained every subject.

The solid-state image pickup element having such effects can be applied as an image pickup device for a digital camera or a video camera.

Figure 12:
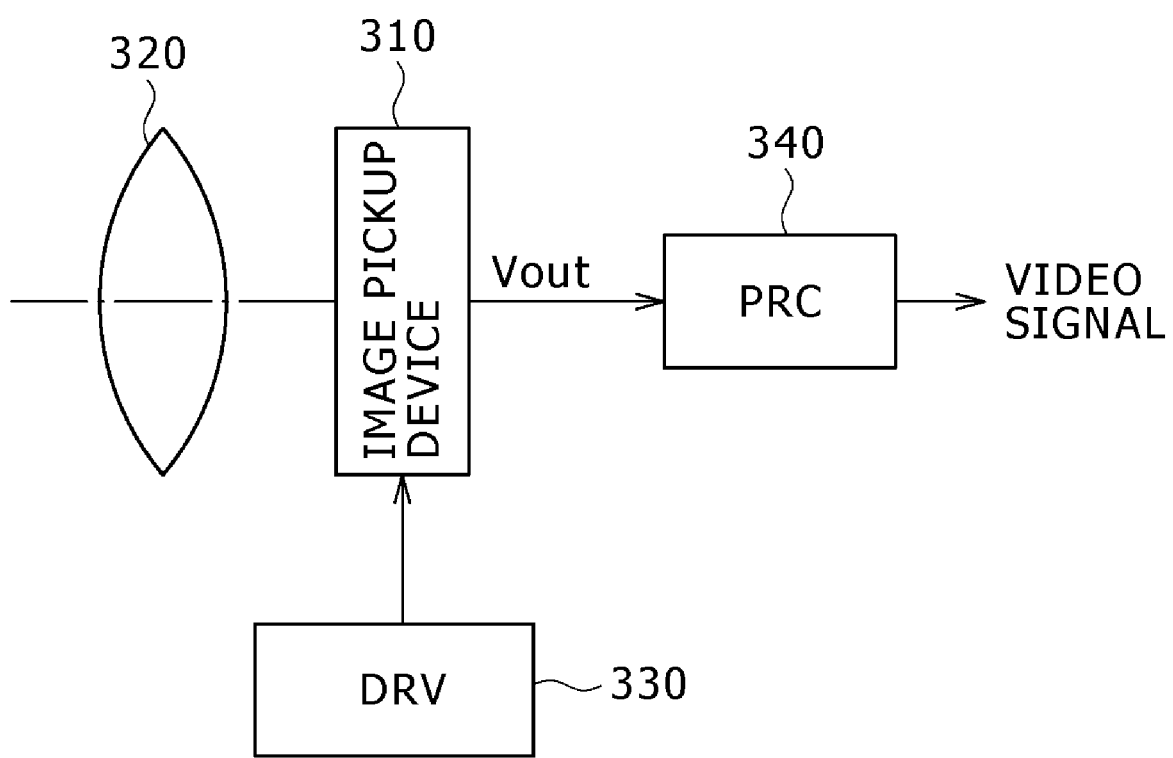
FIG. 12 is a diagram showing an example of a configuration of a camera system to which the solid-state image pickup element according to the embodiment of the present invention is applied.

FIG. 12 is a diagram showing an example of a configuration of a camera system to which the solid-state image pickup element according to the embodiment of the present invention is applied.

This camera system 300, as shown in FIG. 12, has an image pickup device 310 to which the CMOS image sensor (solid-state image pickup element) 100, 200 according to the embodiment can be applied, an optical system for guiding an incident light to a pixel area of the image pickup device 310 (for imaging a subject image), for example, a lens 320 for imaging the incident light (image light) on an imaging area, a driving circuit (DRV) 330 for driving the image pickup device 310, and a signal processing circuit (PRC) 340 for processing an output signal from the image pickup device 310.

The driving circuit 330 has a timing generator (not shown) for generating various kinds of timing signals containing therein a start pulse and a clock pulse in accordance with which circuits within the image pickup device 310 are driven, and drives the image pickup device 310 in accordance with the predetermined timing signal.

In addition, the signal processing circuit 340 subjects the output signal from the image pickup device 310 to predetermined signal processing.

An image signal obtained through the processing in the signal processing circuit 340 is recorded in a recording medium such as a memory. Image information recorded in the recording medium is hard-copied by a printer or the like. In addition, the image signal obtained through the processing in the signal processing circuit 340 is displayed as a moving image on a monitor composed of a liquid crystal display and the like.

As described above, the image pickup element 100, 200 previously stated is mounted as the image pickup device 310 to the image pickup apparatus such as a digital still camera, thereby making it possible to realize the highly precise camera having the less power consumption.

The invention claimed is:

1. A solid-state image pickup element comprising:
a pixel portion having a plurality of pixel circuits, each including (a) an output node, (b) a photoelectric conversion element configured to convert an optical signal into an electrical signal and accumulate the electrical signal, and (c) a transfer element configured to be turned ON and OFF in accordance with a drive signal and transfer the electrical signal in the photoelectric conversion element in an ON state to the output node;
a pixel driving portion configured to perform (d) a first read drive with which the transfer element is turned OFF in accordance with the drive signal to output a first signal at the output node caused by a potential drop on a corresponding signal line, and (e) a second read drive with which the transfer element is turned ON in accordance with the drive signal to transfer the accumulated electrical signal to the output node, thereby outputting a second signal at the output node
a pixel signal reading portion configured to output a signal corresponding to a difference between the second signal read out in accordance with the second read drive and the first signal read out in accordance with first read drive.

2. The solid-state image pickup element according to claim 1, wherein the pixel driving portion and the pixel signal reading portion carry out the first read drive and the second read drive, and the output of the signal corresponding to the difference between the second signal read out in accordance with the second read drive and the first signal read out in accordance with the first read drive for a time period for which data for one row of the pixels is read out.

3. The solid-state image pickup element according to claim 1, wherein the pixel signal reading portion includes:
a plurality of comparators which are disposed so as to correspond to a column arrangement of the pixels, and which compare read-out signal potentials with a reference voltage for judgment, and output judgment results, respectively; and
a plurality of up/down counters operations of which are controlled in accordance with outputs from the comparators, respectively, and each of which counts comparison time of corresponding one of the comparators.

4. The solid-state image pickup element according to claim 3, wherein the plurality of up/down counters carry out either down count or up count in a phase of the first read drive, and carry out either up count or down count in a phase of the second read drive.

5. The solid-state image pickup element according to claim 1, wherein:
a first mode and a second mode can be switched over to each other in accordance with a mode switching signal;
in a phase of the first mode, the pixel driving portion carries out only the second read drive, and the pixel signal reading portion outputs a signal read out in accordance with the second read drive; and in a phase of the second mode, the pixel driving portion carries out the first read drive and the second read drive, and the pixel signal reading portion outputs a signal corresponding to a difference between the signal read out in accordance with the second read drive and a signal read out in accordance with the first read drive.

6. A solid-state image pickup element comprising:
a pixel portion having a plurality of pixel circuits, each including (a) an output node, (b) a photoelectric conversion element configured to convert an optical signal into an electrical signal and accumulate the electrical signal, (c) a reset element configured to be turned ON and OFF in accordance with a reset signal and reset the output node in an ON state, and (d) a transfer element configured to be turned ON and OFF in accordance with a drive signal and transfer the electrical signal in the photoelectric conversion element in the ON state to the output node;
a pixel driving portion configured to perform (e) a first read drive including (i) a reset read drive with which the reset element is turned ON in accordance with the reset signal to output a signal at the output node, and (ii) a non-transfer read drive with which the transfer element is turned OFF in accordance with the drive signal to output a first signal at the output node, the first signal being caused by a potential drop on a corresponding signal line, and (f) a second read drive including (i) a reset read drive with which the reset element is turned ON in accordance with the reset signal to output the signal at the output node, and (ii) a transfer read drive with which the transfer element is turned ON in accordance with the drive signal to transfer the electrical signal to the output node, thereby outputting a second signal at the output node; and
a pixel signal reading portion configured to output a output a signal corresponding to a difference between the second signal read out in accordance with the second read drive and the first signal read out in accordance with the first read drive.

7. The solid-state image pickup element according to claim 6, wherein the pixel driving portion and the pixel signal reading portion carry out the first read drive and the second read drive, and the output of the signal corresponding to the difference between the second signal read out in accordance with the second read drive and the first signal read out in accordance with the first read drive for a time period for which data for one row of the pixels is read out.

8. The solid-state image pickup element according to claim 6, wherein the pixel signal reading portion includes:
a plurality of comparators which are disposed so as to correspond to a column arrangement of the pixels, and which compare read-out signal potentials with a reference voltage for judgment, and output judgment results, respectively; and
a plurality of up/down counters operations of which are controlled in accordance with outputs from the comparators, respectively, and each of which counts comparison time of corresponding one of the comparators.

9. The solid-state image pickup element according to claim 8, wherein the plurality of up/down counters, in the phase of the first read drive, carry out either up count or down count in the reset read drive, and carry out either down count or up count in the non-transfer read drive, and in the phase of the second read drive, carry out either down count or up count in the reset read drive, and carry out either up count or down count in the transfer read drive.

10. The solid-state image pickup element according to claim 8, wherein the plurality of up/down counters in the phase of the first read drive, carry out either down count or up count in the non-transfer read drive, and in the phase of the second read drive, carry out either up count or down count in the transfer read drive.

11. The solid-state image pickup element according to claim 6, wherein:
a first mode and a second mode can be switched over to each other in accordance with a mode switching signal;
in a phase of the first mode, the pixel driving portion carries out only the second read drive, and the pixel signal reading portion outputs a signal read out in accordance with the second read drive; and
in a phase of the second mode, the pixel driving portion carries out the first read drive and the second read drive, and the pixel signal reading portion outputs a signal corresponding to a difference between the signal read out in accordance with the second read drive and a signal read out in accordance with the first read drive.

12. A camera system comprising:
a solid-state image pickup element;
an optical system for imaging an image of a subject on the solid-state image pickup element; and
a signal processing circuit for processing an output image signal from the solid-state image pickup element,
the solid-state image pickup element including
a pixel portion in which a plurality of pixel circuits, each including (a) an output node, (b) a photoelectric conversion element configured to convert an optical signal into an electrical signal and accumulate the electrical signal, and (c) a transfer element configured to be turned ON and OFF in accordance with a drive signal and transfer the electrical signal in the photoelectric conversion element in an ON state to the output node,
a pixel driving portion configured to perform (d) a first read drive with which the transfer element is turned OFF in accordance with the drive signal to output a first signal at the output node caused by a potential drop an a corresponding signal line, and (e) a second read drive with which the transfer element is turned ON in accordance with the drive signal to transfer the accumulated electrical signal to the output node, thereby outputting a second signal at the output node, and
a pixel signal reading portion configured to output a signal corresponding to a difference between the second signal read out in accordance with the second read drive and first signal read out in accordance with the first read drive.

13. A camera system comprising:
a solid-state image pickup element;
an optical system for imaging an image of a subject on the solid-state image pickup element; and
a signal processing circuit for processing an output image signal from the solid-state image pickup element,
the solid-state image pickup element including
a pixel portion having a plurality of pixel circuits, each including (a) an output node, (b) a photoelectric conversion element configured to convert an optical signal into an electrical signal and accumulate the electrical signal, (c) a reset element configured to be turned ON and OFF in accordance with a reset signal and reset the output node in an ON state, and (d) a transfer element configured to be turned ON and OFF in accordance with a drive signal and transfer the electrical signal in the photoelectric conversion element in the ON state to the output node, a pixel driving portion configured to perform (e) a first read drive including (i) a reset read drive with which the reset element is turned ON in accordance with the reset signal to output a signal at the output node, and (ii) a non-transfer read drive with which the transfer element is turned OFF in accordance with the drive signal to output a first signal at the output node, the first signal being caused by a potential drop on a corresponding signal line, and (f) a second read drive including (i) a reset read drive with which the reset element is turned ON in accordance with the reset signal to output the signal at the output node, and (ii) a transfer read drive with which the transfer element is turned ON in accordance with the drive signal to transfer the electrical signal to the output node, thereby outputting a second signal at the output node, and a pixel signal reading portion configured to output a signal corresponding to a difference between the second signal read out in accordance with the second read drive and the first signal read out in accordance with the first read drive.

* * * * *